United States Patent
Nakaho et al.

(10) Patent No.: US 7,088,490 B2
(45) Date of Patent: Aug. 8, 2006

(54) ELECTROCHROMIC MIRROR HAVING VARIABLE REFLECTIVITY

(75) Inventors: Junichi Nakaho, Aichi (JP); Masao Ayabe, Aichi (JP); Masaharu Hattori, Aichi (JP)

(73) Assignee: Kabushiki Kaisha Tokai-Rika-Denki Seisakusho, Aichi-ken (JP)

( * ) Notice: Subject to any disclaimer, the term of this patent is extended or adjusted under 35 U.S.C. 154(b) by 0 days.

(21) Appl. No.: 10/867,778

(22) Filed: Jun. 16, 2004

(65) Prior Publication Data

US 2005/0002080 A1    Jan. 6, 2005

(30) Foreign Application Priority Data

Jun. 18, 2003 (JP) ............................ 2003-173101
Mar. 1, 2004 (JP) ............................ 2004-056387

(51) Int. Cl.
*G02F 1/15* (2006.01)

(52) U.S. Cl. .................. 359/265; 359/270; 359/273

(58) Field of Classification Search ............. 359/265, 359/267, 273, 275, 601, 604, 270, 839
See application file for complete search history.

(56) References Cited

U.S. PATENT DOCUMENTS

| | | | |
|---|---|---|---|
| 3,844,636 A * | 10/1974 | Maricle et al. | 359/267 |
| 4,465,339 A * | 8/1984 | Baucke et al. | 359/274 |
| 6,166,848 A | 12/2000 | Cammenga et al. | |
| 6,178,034 B1 * | 1/2001 | Allemand et al. | 359/265 |
| 6,563,625 B1 * | 5/2003 | Athenstaedt et al. | 359/265 |
| 6,853,472 B1 * | 2/2005 | Warner et al. | 359/270 |
| 2002/0005977 A1 | 1/2002 | Guarr et al. | |

FOREIGN PATENT DOCUMENTS

| | | |
|---|---|---|
| EP | 0-728-618 A2 | 8/1996 |
| EP | 1-152-285 A2 | 11/2001 |
| JP | 60247226 | 12/1985 |
| JP | 62-2587 | 1/1987 |
| JP | 63018336 | 1/1988 |
| JP | 09-120088 | 5/1997 |
| JP | 200018092 | 6/2000 |
| JP | 200018902 | 6/2000 |

OTHER PUBLICATIONS

European Search Report dated Sep. 3, 2004 for Application No. EP-04-01-3968.

* cited by examiner

*Primary Examiner*—Hung Xuan Dang
*Assistant Examiner*—Joseph Martinez
(74) *Attorney, Agent, or Firm*—Thomas W. Cole; Nixon Peabody LLP

(57) ABSTRACT

The present invention provides an electrochromic mirror including: a transparent substrate; a transparent electrode film which is formed on the transparent substrate and has conductivity; an electrochromic film which is formed on the transparent electrode film and can be colored by reduction; a light reflecting film which is formed on the electrochromic film and which hydrogen atoms or lithium atoms can permeate; a support substrate which has a conductive part having conductivity formed on at least one surface thereof; and an electrolytic solution containing at least hydrogen ions or lithium ions, and neutral molecules or negative ions which can be oxidized, wherein the transparent substrate is located close to the support substrate such that the conductive part faces the light reflecting film, and the electrolytic solution is enclosed between the light reflecting film and the conductive part.

26 Claims, 2 Drawing Sheets

PRIOR ART

ELECTROCHROMIC MIRROR HAVING VARIABLE REFLECTIVITY

CROSS-REFERENCE TO RELATED APPLICATION

This application claims priority under 35 USC 119 from Japanese Patent Application Nos. 2003-173101 and 2004-56387, the disclosures of which are incorporated by reference herein.

BACKGROUND OF THE INVENTION

1. Field of the Invention

The present invention relates to a rearview mirror for indoor or outdoor use which is applied to a vehicle such as a car, and more particularly, to an electrochromic mirror in which the reflectivity can be changed by applying voltage.

2. Description of the Related Art

Conventionally, an "electrochromic mirror" is known (for instance, see Japanese Utility Model Application Publication (JP-Y) No. 62-2587). An electrochromic mirror may be used as a rearview mirror for a vehicle such as a car and can electrically change the reflectivity so as to reduce the glare of the headlight of a following car at night.

As shown in FIG. 2, in an electrochromic mirror 100 disclosed in JP-Y No. 62-2587, a transparent electrode 104, a thin film made of iridium hydroxide $(Ir(OH)_3)$ 106, a thin film made of tantalum pentoxide $(Ta_2O_5)$ 108, a thin film made of tungsten trioxide $(WO_3)$ 110, and an aluminum (Al) electrode 112 are sequentially laminated on the back surface of a glass substrate 102 by vacuum deposition or the like. A glass plate 114 for protecting the thin films is adhered to the aluminum (Al) electrode 112 or the like by a sealant (adhesive) 116. When a voltage is applied between the transparent electrode 104 and the aluminum (Al) electrode 112 by a power supply 118, the thin film made of iridium hydroxide $(Ir(OH)_3)$ 106 and the thin film made of tungsten trioxide $(WO_3)$ 110 react to be colored, and the reflectivity of the electrochromic mirror 100 is changed (see arrow B shown in FIG. 2).

However, if the balance of the film thickness and film quality of each thin film described above is not kept in the electrochromic mirror 100, the thin film which becomes colored once may not return to its original state. In addition, problems exist in that stringent production conditions are required and the formation of a multi-layer film using vacuum deposition is expensive since any variation in the film thickness largely influences the performance.

On the other hand, an electrochromic mirror in which the reflectivity is changed by the coloring reaction of a so-called "electrochromic solution" which is a solution that is electrically colored is known (for instance, see Japanese Patent No. 2672083).

As shown in FIG. 3, in an electrochromic mirror 200 disclosed in Japanese Patent No. 2672083, two glass substrates 202 and 204 are arranged in parallel at a proper interval, and transparent electrode films 206 are respectively formed on the inner surfaces of the glass substrates 202 and 204. An electrochromic solution 210 is enclosed in a cell sealed by a sealant 208 between the transparent electrode films 206. A reflecting film 212 and a protective film 214 are formed on the back surface of the glass substrate 204 (the surface at the lower side in FIG. 3). When a voltage is applied between the transparent electrode films 206 by a power supply 216, the electrochromic solution 210 is colored, and the reflectivity of the electrochromic mirror 200 is changed.

However, when the two glass substrates 202,204 are not adhered together in parallel with a high precision via a sealant 208 in the electrochromic mirror 200, the image of the reflected light (see arrow C shown in FIG. 3) due to the reflecting film 212 does not coincide with that of the reflected light due to the surface of the glass substrate 202 (the surface at the upper side in FIG. 3). Therefore, so-called double images occur, and it is extremely difficult to see by using the mirror. In particular, since a mirror for a car is generally curved, a problem exists in that it is extremely difficult to manufacture the mirror, and thus the cost is high.

Therefore, there is a need in the art for an electrochromic mirror which can be easily manufactured at a low cost, causes no double images, and has a simple structure and high performance.

SUMMARY OF THE INVENTION

A first aspect of the present invention provides an electrochromic mirror having: a transparent substrate; a transparent electrode film which is formed on the transparent substrate and has conductivity; an electrochromic film which is formed on the transparent electrode film and can be colored by reduction; a light reflecting film which is formed on the electrochromic film and which hydrogen atoms can permeate; a support substrate which has a conductive part having conductivity formed on at least one surface thereof; and an electrolytic solution containing at least hydrogen ions, and neutral molecules or negative ions which can be oxidized, wherein the transparent substrate is located close to the support substrate such that the conductive part faces the light reflecting film, and the electrolytic solution is enclosed between the light reflecting film and the conductive part.

In the electrochromic mirror, the transparent electrode film having conductivity is formed on the back surface of the transparent substrate, and the electrochromic film which can be colored by reduction is formed on the transparent electrode film. In addition, the light reflecting film which hydrogen atoms can permeate is formed on the electrochromic film. As a result, the electrochromic film is formed between the transparent electrode film and the light reflecting film.

The support substrate is located close to the back surface of the transparent substrate, and the light reflecting film faces the conductive part of the support substrate. The electrolytic solution is enclosed between the light reflecting film and the conductive part of the substrate. The electrolytic solution contains at least hydrogen ions, and neutral molecules or negative ions which can be oxidized.

Herein, for instance when a negative voltage is applied to the transparent electrode film and a positive voltage is applied to the conductive part of the substrate by a power supply (battery or the like) mounted on a vehicle, the hydrogen ions contained in the electrolytic solution move toward the light reflecting film side of the transparent substrate, and the hydrogen ions are changed into hydrogen atoms. The hydrogen atoms permeate the light reflecting film, and move toward the electrochromic film. Therefore, the following reduction reaction occurs in the electrochromic film.

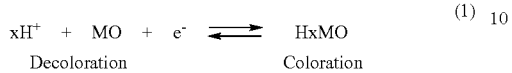
$$xH^+ + MO + e^- \rightleftarrows H_xMO \quad (1)$$
Decoloration ⇌ Coloration $H^+$ is a hydrogen ion, MO is the material of an electrochromic film, and $e^-$ is an electron.

On the other hand, as described above, the electrolytic solution contains the neutral molecules or the negative ions which can be oxidized, and thereby the above reduction reaction of the electrochromic film is guaranteed.

That is, when the electrolytic solution contains the neutral molecules which can be oxidized and the neutral molecule is A, the following oxidation reaction occurs near the conductive part of the support substrate to which a positive voltage is applied in the electrolytic solution.

$$A - e^- \rightleftarrows A^+ \quad (2)$$

When the electrolytic solution contains the negative ions which can be oxidized and the negative ion is B, the following oxidation reaction occurs near the conductive part of the support substrate to which a positive voltage is applied in the electrolytic solution.

$$B^- - e^- \rightleftarrows B \quad (3)$$

Therefore, for instance, when the electrochromic film is made of $WO_3$ and the electrolytic solution contains the neutral molecules which can be oxidized, the whole reaction is represented by the following formula (4).

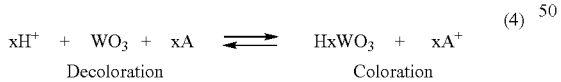
$$xH^+ + WO_3 + xA \rightleftarrows H_xWO_3 + xA^+ \quad (4)$$
Decoloration ⇌ Coloration For instance, when the electrochromic film is made of $WO_3$ and the electrolytic solution contains the negative ions which can be oxidized, the whole reaction is represented by the following formula (5).

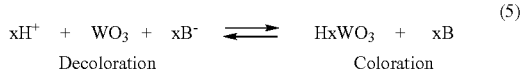
$$xH^+ + WO_3 + xB^- \rightleftarrows H_xWO_3 + xB \quad (5)$$
Decoloration ⇌ Coloration The electrochromic film is colored by reduction. (The electrolytic solution contains the negative ions so as to match the formula (1) with the formula (2). The electrolytic solution may not be colored by the reaction in the electrolytic solution.)

Therefore, light enters the transparent substrate from the surface side of the transparent substrate (the side opposite to the surface on which the transparent electrode film, the electrochromic film and the light reflecting film are formed), and is reflected by the light reflecting film. The light passes through the colored electrochromic film, and thereby the amount of the light is reduced. The reflectivity of the electrochromic film is changed to exhibit glare-proofing effect.

The electrochromic mirror has a simple structure in which the transparent electrode film, the electrochromic film and the light reflecting film (three films) are formed on the back surface of the transparent substrate. The film quality and film thickness or the like of each film do not easily influence performance. Therefore, the electrochromic mirror is easily manufactured at a low cost.

Since the electrochromic film is formed between the transparent electrode film to which a negative voltage is applied and the light reflecting film, hydrogen ions are compulsorily drawn into the electrochromic film. As a result, the response of the reduction coloring of the electrochromic film is improved.

In addition, since the light entering the transparent substrate is reflected by the light reflecting film formed on the back surface of the transparent substrate, double images are prevented from occurring.

When liquids having high reactivity are generally used as the electrolytic solution, the material of the electrochromic film such as tungsten trioxide may be dissolved little by little in the electrolytic solution. In this case, since the electrochromic film is formed inside of the light reflecting film, and is protected by the light reflecting film in the electrochromic mirror of the first aspect, the electrolytic solution can be selected in a wide range.

Thus, the electrochromic mirror of the first aspect can be easily manufactured at a low cost. In addition, no double images occur, and the electrochromic mirror has a simple structure and high performance.

A second aspect of the invention provides an electrochromic mirror having: a transparent substrate; a transparent electrode film which is formed on the transparent substrate and has conductivity; an electrochromic film which is formed on the transparent electrode film and can be colored by reduction; a light reflecting film which is formed on the electrochromic film and which lithium atoms can permeate; a support substrate which has a conductive part having conductivity formed on at least one surface thereof; and an electrolytic solution containing at least lithium ions, and neutral molecules or negative ions which can be oxidized, wherein the transparent substrate is located close to the support substrate such that the conductive part faces the light reflecting film, and the electrolytic solution is enclosed between the light reflecting film and the conductive part.

In the electrochromic mirror, the transparent electrode film having conductivity is formed on the back surface of the transparent substrate, and the electrochromic film which can be colored by reduction is formed on the transparent electrode film. In addition, the light reflecting film which lithium atoms can permeate is formed on the electrochromic film. As a result, the electrochromic film is formed between the transparent electrode film and the light reflecting film.

The support substrate is located close to the back surface of the transparent substrate, and the light reflecting film faces the conductive part of the substrate. The electrolytic solution is enclosed between the light reflecting film and the conductive part of the substrate. The electrolytic solution contains at least lithium ions and neutral molecules or negative ions which can be oxidized.

Herein, for instance, when a negative voltage is applied to the transparent electrode film and a positive voltage is applied to the conductive part of the support substrate by a power supply (battery or the like) mounted on a vehicle, the lithium ions contained in the electrolytic solution move toward the light reflecting film side of the transparent substrate, and the lithium ions are changed into lithium atoms. The lithium atoms permeate the light reflecting film, and move toward the electrochromic film. Therefore, the following reduction reaction occurs in the electrochromic film.

(6)

$Li^+$ is a lithium ion, MO is the material of an electrochromic film, and $e^-$ is an electron.

On the other hand, as described above, the electrolytic solution contains the neutral molecules or the negative ions which can be oxidized, and thereby the above reduction reaction of the electrochromic film is guaranteed.

That is, when the electrolytic solution contains the neutral molecules which can be oxidized and the neutral molecule is A, the following oxidation reaction occurs near the conductive part of the support substrate to which a positive voltage is applied in the electrolytic solution.

(7)

When the electrolytic solution contains the negative ions which can be oxidized and the negative ion is B, the following oxidation reaction occurs near the conductive part of the support substrate to which a positive voltage is applied in the electrolytic solution.

(8)

Therefore, for instance, when the electrochromic film is made of $WO_3$ and the electrolytic solution contains the neutral molecules which can be oxidized, the whole reaction is represented by the following formula (9).

(9)

For instance, when the electrochromic film is made of $WO_3$ and the electrolytic solution contains the negative ions which can be oxidized, the whole reaction is represented by the following formula (10).

(10)

The electrochromic film is colored by reduction. (The electrolytic solution contains the negative ions so as to match the formula (6) with the formula (7). The electrolytic solution may not be colored by the reaction in the electrolytic solution.)

Therefore, light enters the transparent substrate from the surface side of the transparent substrate (the side opposite to the surface on which the transparent electrode film, the electrochromic film and the light reflecting film are formed), and is reflected by the light reflecting film. The light passes through the colored electrochromic film, and thereby the amount of the light is reduced. The reflectivity of the electrochromic film is changed to exhibit glare-proofing effect.

The electrochromic mirror has a simple structure in which the transparent electrode film, the electrochromic film and the light reflecting film (three films) are formed on the back surface of the transparent substrate. The film quality and film thickness or the like of each film do not easily influence performance. Therefore, the electrochromic mirror is easily manufactured at a low cost.

Since the electrochromic film is formed between the transparent electrode film to which a negative voltage is applied and the light reflecting film, lithium ions are compulsorily drawn into the electrochromic film. As a result, the response of the reduction coloring of the electrochromic film is improved.

In addition, since the light entering the transparent substrate is reflected by the light reflecting film formed on the back surface of the transparent substrate, double images are prevented from occurring.

When liquids having high reactivity are generally used as the electrolytic solution, the material of the electrochromic film such as tungsten trioxide may be dissolved little by little in the electrolytic solution. In this case, since the electrochromic film is formed inside of the light reflecting film, and is protected by the light reflecting film in the electrochromic mirror of the second aspect, the electrolytic solution can be selected in a wide range.

Thus, the electrochromic mirror of the second aspect can be easily manufactured at a low cost. In addition, no double images occur, and the electrochromic mirror has a simple structure and high performance.

As described above, the electrochromic mirror of the invention can be easily manufactured at a low cost. In addition, no double images occur, and the electrochromic mirror has a simple structure and high performance.

DETAILED DESCRIPTION OF THE INVENTION

First Embodiment

Figure 1:
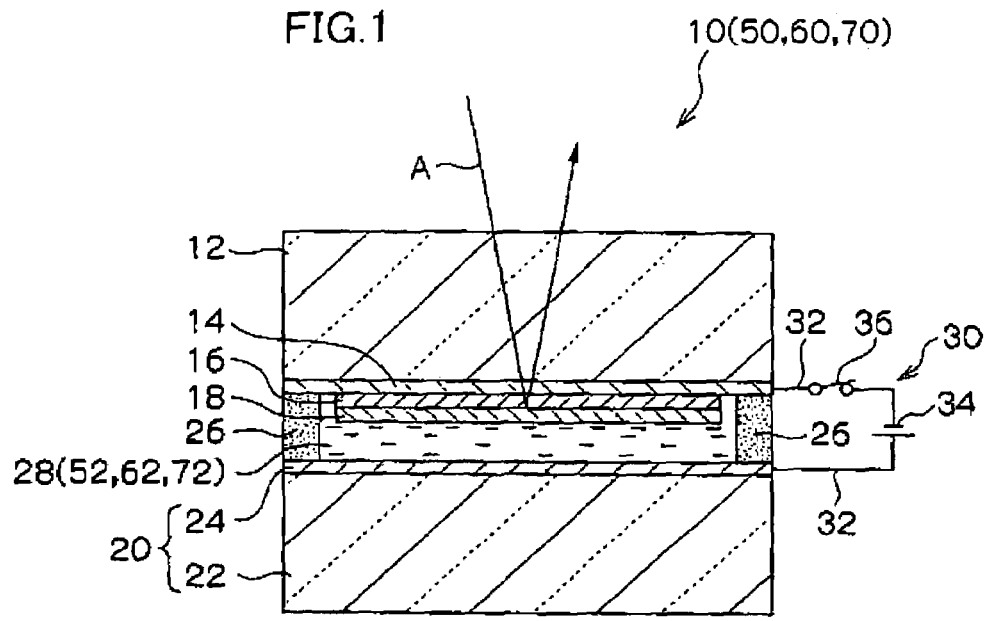
FIG. 1 is a cross-sectional view showing the constructions of the electrochromic mirrors of first-fourth embodiments of the invention.
Figure 2:
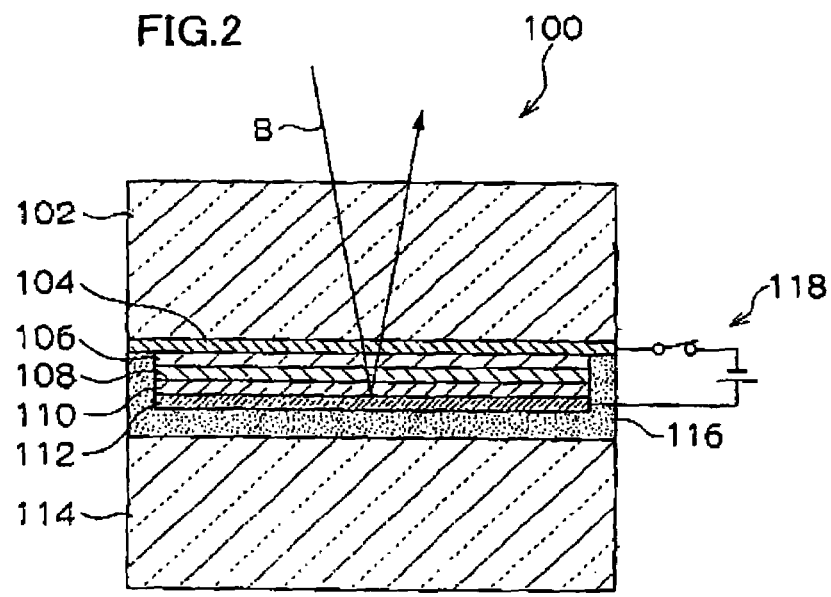
FIG. 2 is a cross-sectional view showing the construction of a conventional electrochromic mirror.
Figure 3:
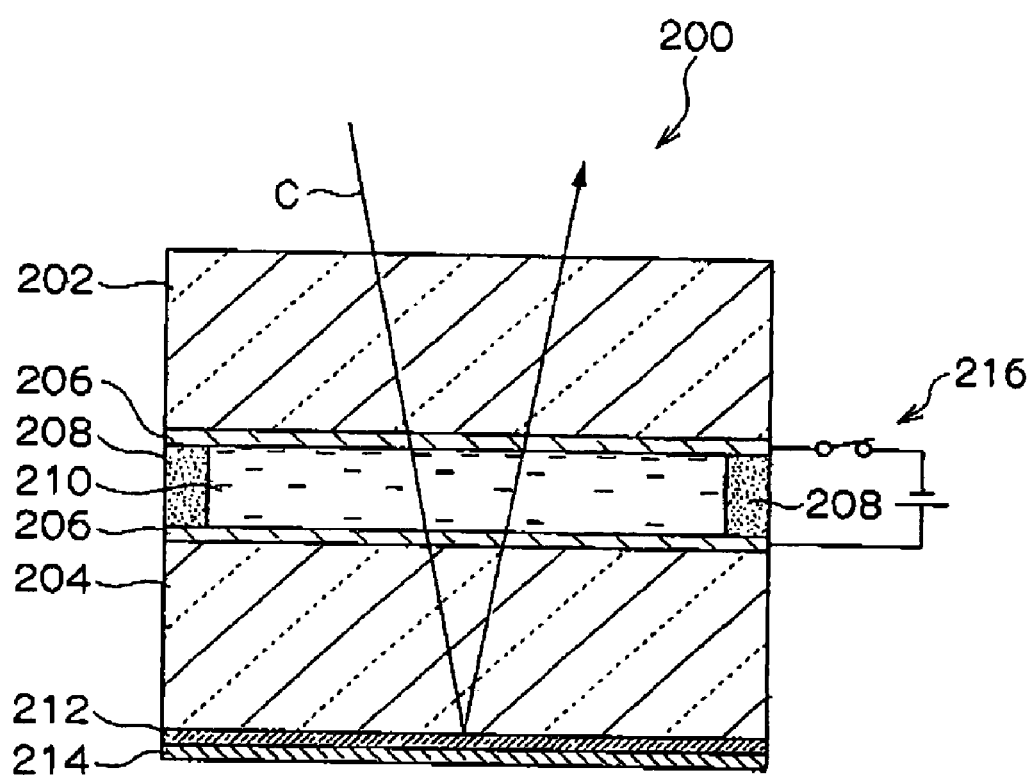
FIG. 3 is a cross-sectional view showing the construction of another conventional electrochromic mirror.

FIG. 1 is a cross-sectional view of the construction of the electrochromic mirror 10 of a first embodiment of the invention.

The electrochromic mirror 10 has a glass substrate 12 which is a transparent substrate. A transparent electrode film 14 is formed in the form of a thin film on the back surface of the glass substrate 12 by vacuum deposition or the like (the surface at the lower side in FIG. 1). The transparent electrode film 14 is a so-called "ITO film" made of a mixture of indium oxide and tin oxide in the first embodiment.

An electrochromic film 16 which can be colored by reduction is formed in the form of a thin film on the transparent electrode film 14 by vacuum deposition or the like. The electrochromic film 16 is made of tungsten trioxide ($WO_3$) in the first embodiment.

A light reflecting film 18 is formed in the form of a thin film on the electrochromic film 16 by vacuum deposition or the like. The light reflecting film 18 is made of rhodium in the first embodiment.

The electrochromic film 16 and the light reflecting film 18 are not formed at both end portions in the width direction of the glass substrate 12, (at both end portions in the horizontal direction in FIG. 1), and only the transparent electrode film 14 is formed there.

A substrate (support substrate) 20 is disposed close to the back surface of the glass substrate 12. The substrate 20 is composed of a glass support 22 and an electrode film 24, which is a conductive part, formed in the form of a thin film on one surface of the glass support 22 by means such as vacuum deposition. End portions on the electrode film 24 side of the substrate 20 are adhered to the transparent electrode film 14 by a sealant 26 such that the electrode film 24 faces the light reflecting film 18. The electrode film 24 is made of a metal such as chrome in the first embodiment.

A space sealed by a sealant 26 is formed between the light reflecting film 18 and the electrode films 24 of the substrate 20, and an electrolytic solution 28 is enclosed in the space.

The electrolytic solution 28 contains propylene carbonate as a solvent, sulfuric acid ($H_2SO_4$) as a hydrogen ion agent, and ferrocene ($Fe(C_5H_5)_2$) which is a neutral material as a redox agent in the first embodiment.

A power supply 30 is electrically connected to the transparent electrode film 14 and the electrode film 24 of the substrate 20 via wiring 32. The power supply 30 has a direct-current power supply 34 and a switch 36. In the state that the switch 36 is turned on, a negative electrode of the direct-current power supply 34 is electrically connected to the transparent electrode film 14 and a positive electrode of the direct-current power supply 34 is electrically connected to the electrode film 24. The transparent electrode film 14 and the electrode film 24 can form a short circuit via a circuit (not shown).

Next, the action of the first embodiment will be described.

When the switch 36 of the power supply 30 is turned on in the electrochromic mirror 10, a negative voltage is applied to the transparent electrode film 14 and a positive voltage is applied to the electrode film 24 by the direct-current power supply 34. Therefore, the hydrogen ions contained in the electrolytic solution 28 move toward the light reflecting film 18 side, and are changed into hydrogen atoms. The hydrogen atoms permeate the light reflecting film 18 and move toward the electrochromic film 16. As a result, the following reduction reaction occurs in the electrochromic film 16.

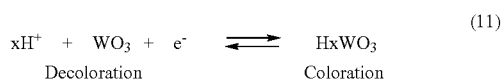

$$xH^+ + WO_3 + e^- \rightleftarrows H_xWO_3 \quad (11)$$
$$\text{Decoloration} \qquad \text{Coloration}$$

$H^+$ is a hydrogen ion, and $e^-$ is an electron.

At this time, the following oxidation reaction occurs near the electrode film 24 in the electrolytic solution 28.

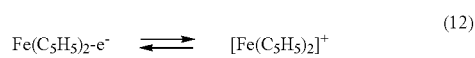

$$Fe(C_5H_5)_2 - e^- \rightleftarrows [Fe(C_5H_5)_2]^+ \quad (12)$$

Therefore, the whole reaction is as follows.

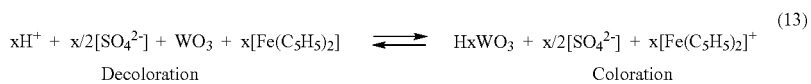

$$xH^+ + x/2[SO_4^{2-}] + WO_3 + x[Fe(C_5H_5)_2] \rightleftarrows H_xWO_3 + x/2[SO_4^{2-}] + x[Fe(C_5H_5)_2]^+ \quad (13)$$
$$\text{Decoloration} \qquad\qquad \text{Coloration}$$

Tungsten trioxide ($WO_3$) which is the material of the electrochromic film 16 is colored. As a result, light (see the arrow shown in FIG. 1) which enters the glass substrate 12 from the surface side of the glass substrate 12 and is reflected by the light reflecting film 18 passes through the colored electrochromic film 16, and the amount of the light is reduced. Therefore, the reflectivity of the electrochromic film 10 is changed to exhibit glare-proofing effect.

On the other hand, when the switch 36 of the power supply 30 is turned off, and application of voltages to the transparent electrode film 14 and the electrode film 24 is stopped, and the transparent electrode film 14 and the electrode film 24 form a short circuit via the circuit (not shown), hydrogen atoms which react with the electrochromic film 16 return to the electrolytic solution 28. Thereby, tungsten trioxide ($WO_3$) which is the material of the electrochromic film 16 is decolored.

Herein, the electrochromic mirror 10 has a simple structure in which the transparent electrode film 14, the electrochromic film 16 and light reflecting film 18 (only three films) are formed on the glass substrate 12. The film thickness and the film quality or the like of the transparent electrode film 14, the electrochromic film 16 and the light reflecting film 18 do not easily influence performance. Therefore, the electrochromic mirror is easily manufactured at a low cost.

Since the electrochromic film 16 is formed between the transparent electrode film 14 to which a negative voltage is applied and the light reflecting film 18, hydrogen ions are compulsorily drawn into the electrochromic film 16. As a result, the response of the reduction coloring of the electrochromic film 16 is improved.

In addition, since the light entering the glass substrate 12 from the surface side is reflected by the light reflecting film 18 formed on the back surface of the glass substrate 12, double images are prevented from occurring.

Thus, the electrochromic mirror 10 can be easily manufactured at a low cost. In addition, no double images occur, and the electrochromic mirror has a simple structure and high performance.

In the first embodiment, sulfuric acid is used as a hydrogen ion agent contained in the electrolytic solution 28, but the invention is not limited thereto. A general acid can be used as the hydrogen ion agent contained in the electrolytic solution 28, and examples of the acid include hydrochloric acid, phosphoric acid, acetic acid, oxalic acid, formic acid and perchloric acid.

In the first embodiment, ferrocene ($Fe(C_5H_5)_2$) used as neutral molecules (neutral material) contained in the electrolytic solution 28 is a compound containing iron, but the invention is not limited thereto. A compound which is generally called metallocene can be used as neutral molecules (neutral material) contained in the electrolytic solution 28.

Second Embodiment

Next, the second embodiment of the invention will be described. The same structure and action as those of the first embodiment are designated by the same reference numerals as in the first embodiment, and descriptions thereof are omitted.

As shown in FIG. 1, an electrochromic mirror 50 of the second embodiment has the same structure as that of the electrochromic mirror 10 of the first embodiment, except that an electrolytic solution is different from that of the first embodiment. A solvent of the electrolytic solution 52 of the electrochromic mirror 50 is propylene carbonate, and the electrolytic solution 52 contains lithium perchlorate ($LiClO_4$) as a lithium ion agent and ferrocene ($Fe(C_5H_5)_2$) which is a neutral material as a redox agent.

When the switch 36 of the power supply 30 is turned on in the electrochromic mirror 50, a negative voltage is applied to the transparent electrode film 14 and a positive voltage is applied to the electrode film 24 by the direct-current power supply 34. Therefore, the lithium ions contained in the electrolytic solution 52 move toward the light reflecting film 18 side, and are changed into lithium atoms. The lithium atoms permeate the light reflecting film 18 and move toward the electrochromic film 16. As a result, the following reduction reaction occurs in the electrochromic film 16.

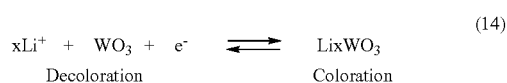

(14)

$Li^+$ is a lithium ion and $e^-$ is an electron.

At this time, oxidation reaction which is the same as the formula (12) in the first embodiment occurs near the electrode film 24 in the electrolytic solution 52.

Therefore, the whole reaction is as follows.

(15)

Tungsten trioxide ($WO_3$) which is the material of the electrochromic film 16 is colored. As a result, light (see the arrow shown in FIG. 1) which enters the glass substrate 12 from the surface side of the glass substrate 12 and is reflected by the light reflecting film 18 passes through the colored electrochromic film 16, and the amount of the light is reduced. Therefore, the reflectivity of the electrochromic film 10 is changed to exhibit glare-proofing effect.

On the other hand, when the switch 36 of the power supply 30 is turned off, and the application of voltages to the transparent electrode film 14 and the electrode film 24 is stopped, and the transparent electrode film 14 and the electrode film 24 form a short circuit via the circuit (not shown), lithium atoms which react with the electrochromic film 16 return to the electrolytic solution 52. Thereby, tungsten trioxide ($WO_3$) which is the material of electrochromic film 16 is decolored.

In the second embodiment, lithium perchlorate ($LiClO_4$) is used as a lithium ion agent contained in the electrolytic solution 52, but the invention is not limited thereto. Examples of the lithium ion agent contained in the electrolytic solution 52 include lithium salts such as lithium tetrafluoroborate ($LiBF_4$) and lithium hexafluoroarsenate ($LiAsF_6$).

Third Embodiment

Next, the third embodiment of the invention will be described. The same structure and action as those of the first embodiment are designated by the same reference numerals as in the first embodiment, and descriptions thereof are omitted.

As shown in FIG. 1, an electrochromic mirror 60 of the third embodiment has the same structure as that of the electrochromic mirror 10 of the first embodiment, except that an electrolytic solution is different from that of the first embodiment. A solvent of the electrolytic solution 62 of the electrochromic mirror 60 is propylene carbonate, and the electrolytic solution 62 contains ferrocyanic acid ($H_4[Fe(CN)_6]$) as an electrolyte.

When the switch 36 of the power supply 30 is turned on in the electrochromic mirror 60, a negative voltage is applied to the transparent electrode film 14 and a positive voltage is applied to the electrode film 24 by the direct-current power supply 34. As a result, reduction reaction which is the same as the formula (11) in the first embodiment occurs in the electrochromic film 16.

On the other hand, the following oxidation reaction occurs near the electrode film 24 in the electrolytic solution 62.

(16)

Therefore, the whole reaction is as follows.

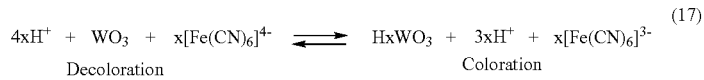
(17)

Tungsten trioxide ($WO_3$) which is the material of the electrochromic film 16 is colored. As a result, light (see the arrow shown in FIG. 1) which enters the glass substrate 12 from the surface side of the glass substrate 12 and is reflected by the light reflecting film 18 passes through the colored electrochromic film 16, and the amount of the light is reduced. Therefore, the reflectivity of the electrochromic film 50 is changed to exhibit glare-proofing effect.

Fourth Embodiment

Next, the fourth embodiment of the invention will be described. The same structure and action as those of the first embodiment are basically designated by the same reference numerals as in the first embodiment, and descriptions thereof are omitted.

As shown in FIG. 1, an electrochromic mirror 70 of the fourth embodiment has the same structure as that of the electrochromic mirror 10 of the first embodiment, except that an electrolytic solution is different from that of the first embodiment. The solvent of the electrolytic solution 72 of the electrochromic mirror 70 is water, and the electrolytic solution 62 contains potassium ferrocyanide ($K_4[Fe(CN)_6]$) as an electrolyte. In this case, hydrogen ions contained in water are used as hydrogen ions contained in the electrolytic solution 72.

When the switch 36 of the power supply 30 is turned on in the electrochromic mirror 70, a negative voltage is applied to the transparent electrode film 14 and a positive voltage is applied to the electrode film 24 by the direct-current power supply 34. As a result, reduction reaction which is the same as the formula (11) in the first embodiment occurs in the electrochromic film 16. Oxidation reaction which is the same as the formula (16) in the third embodiment occurs near the electrode film 24 in the electrolytic solution 72.

Therefore, the whole reaction is as follows.

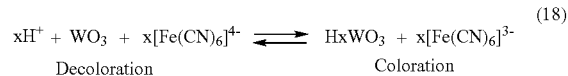
(18)

Tungsten trioxide ($WO_3$) which is the material of the electrochromic film 16 is colored. (Potassium ions ($K^+$) and hydroxyl ions ($OH^-$) which are not described in the formula (18) are not changed.)

As a result, light (see the arrow shown in FIG. 1) which enters the glass substrate 12 from the surface side of the glass substrate 12 and is reflected by the light reflecting film 18 passes through the colored electrochromic film 16, and the amount of the light is reduced. Therefore, the reflectivity of the electrochromic film 60 is changed to exhibit glare-proofing effect.

In the first-fourth embodiments, it is preferable that each of the electrolytic solutions 28, 52, 62 and 72 contains a polymer or an inorganic substance which is nonreactive with the electrolytic solution and is gelled.

As a result, liquid leakage can be prevented even when the electrochromic mirror is damaged. Examples of the polymer include an acrylic resin, and examples of the inorganic substance include silica.

In the first-fourth embodiments, a platinum group noble metal such as platinum, rhodium, palladium, or an alloy including any of these metals (for instance, an alloy of silver and a platinum-group metal or the like) is preferable as the material of the light reflecting film. This is because the platinum group noble metal makes hydrogen molecules hydrogen atoms due to its catalyst operation and holds the hydrogen atoms, and the hydrogen atoms easily permeates the light reflecting film. The platinum group noble metal absorbs hydrogen in the electrochromic film and returns the hydrogen to the electrolytic solution when application of voltages is stopped. When lithium atoms are allowed to permeate the light reflecting film, the light reflecting film is preferably made of rhodium since lithium atoms permeates a rhodium film very well.

In the first-fourth embodiments, preferable examples of the transparent electrode film include a so-called "ITO film" made of a mixture of indium oxide and tin oxide, a so-called "FTO film" in which fluorine is doped in tin oxide, or a so-called "ATO film" in which antimony is doped in tin oxide.

Though a metal plate having conductivity or the like can be used as the (support) substrate of the electrochromic mirror, a material having a thermal expansion coefficient approximate to that of the transparent substrate is preferable as the material of the support substrate. Therefore, a thin film (electrode film) having conductivity such as a metal film and a transparent conductive film is preferably formed on the surface of the substrate made of the same material (for instance, a glass and a plastic resin or the like) as the transparent substrate, and used as a conductive part.

As the material (MO) of the electrochromic film, tungsten trioxide ($WO_3$), molybdenum trioxide ($MoO_3$) and a mixture containing at least one of tungsten trioxide and molybdenum trioxide is preferable.

What is claimed is:

1. An electrochromic mirror comprising:
   a transparent substrate;
   a transparent electrode film which is formed on the transparent substrate and has conductivity;
   an electrochromic film which is formed on the transparent electrode film and can be colored by reduction;
   a light reflecting film which is formed on the electrochromic film and which hydrogen atoms can permeate;
   a support substrate which has a conductive part having conductivity formed on at least one surface thereof; and
   an electrolytic solution containing at least hydrogen ions, and a reduction promoting agent including neutral molecules or negative ions which can be oxidized to promote a coloring of the electrochromic film by reduction.
   wherein the transparent substrate is located close to the support substrate such that the conductive part faces the light reflecting film, and the electrolytic solution is enclosed between the light reflecting film and the conductive part.

2. The electrochromic mirror of claim 1, wherein the conductive part of the support substrate is an electrode film which is formed on the support substrate and has conductivity.

3. The electrochromic mirror of claim 2, wherein the support substrate and the transparent substrate are made of the same material.

4. The electrochromic mirror of claim 1, wherein the electrochromic film comprises at least one of tungsten trioxide and molybdenum trioxide.

5. The electrochromic mirror of claim 1, wherein the light reflecting film comprises at least one of a platinum-group metal, and an alloy of a platinum-group metal and silver.

6. The electrochromic mirror of claim 1, wherein the light reflecting film comprises rhodium.

7. The electrochromic mirror of claim 1, wherein the electrolytic solution contains a gelling agent formed from a polymer or an inorganic substance which is nonreactive with the electrolytic solution, wherein said gelling agent is different from said agent that provides said neutral molecules or negative ions which can be oxidized.

8. The electrochromic mirror of claim 7, wherein the polymer which is nonreactive with the electrolytic solution is an acrylic resin.

9. The electrochromic mirror of claim 7, wherein the inorganic substance which is nonreactive with the electrolytic solution is silica.

10. An electrochromic mirror of claim 1, wherein said light reflecting film is a specularly reflecting film of metal.

11. An electrochromic mirror comprising:
    a transparent substrate;
    a transparent electrode film which is formed on the transparent substrate and has conductivity;
    an electrochromic film which is formed on the transparent electrode film and can be colored by reduction;
    a light reflecting film which is formed on the electrochromic film and which lithium atoms can permeate;
    a support substrate which has a conductive part having conductivity formed on at least one surface thereof; and
    an electrolytic solution containing at least lithium ions, and a reduction promoting agent including neutral molecules or negative ions which can be oxidized to promote a coloring of the electrochromic film by reduction.
    wherein the transparent substrate is located close to the support substrate such that the conductive part faces the light reflecting film, and The electrolytic solution is enclosed between the light reflecting film and the conductive part.

12. The electrochromic mirror of claim 11, wherein the conductive part of the support substrate is an electrode film which is formed on the support substrate and has conductivity.

13. The electrochromic mirror of claim 12, wherein the support substrate and the transparent substrate are made of the same material.

14. The electrochromic mirror of claim 11, wherein the electrochromic film comprises at least one of tungsten trioxide and molybdenum trioxide.

15. The electrochromic mirror of claim 11, wherein the light reflecting film comprises at least one of a platinum-group metal, and an alloy of a platinum-group metal and silver.

16. The electrochromic mirror of claim 11, wherein the light reflecting film comprises rhodium.

17. The electrochromic mirror of claim 11, wherein the electrolytic solution contains a polymer or an inorganic substance which is nonreactive with the electrolytic solution, and is gelled, and is different from said reduction promoting agent.

18. The electrochromic mirror of claim 17, wherein the polymer which is nonreactive with the electrolytic solution is an acrylic resin.

19. The electrochromic mirror of claim 17, wherein the inorganic substance which is nonreactive with the electrolytic solution is silica.

20. The electrochromic mirror of claim 11, wherein the support substrate and the transparent electrode film are adhered to each other by using a sealant.

21. An electrochromic mirror comprising:
    a transparent substrate;
    a transparent electrode film which is formed on the transparent substrate and has conductivity;
    an electrochromic film which is formed on the transparent electrode film and can be colored by reduction;
    a light reflecting film which is formed on the electrochromic film and which lithium atoms can permeate;
    a support substrate which has a conductive part having conductivity formed on at least one surface thereof; and
    an electrolytic solution containing one hydrogen and lithium ions, and an organo-metallic compound,
    wherein the transparent substrate is located close to the support substrate such that the conductive part faces the light reflecting film, and the electrolytic solution is enclosed between the light reflecting film and the conductive part.

22. An electrochromic mirror of claim 21, wherein said solution contains a metallocene.

23. An electrochromic mirror of claim 22, wherein said metallocene is ferrocene.

24. An electrochromic mirror of claim 21, wherein said electrolyte solution includes ferrocyanic acid.

25. An electrochromic mirror of claim 21, wherein said electrolyte includes water and potassium ferrocyanide.

26. An electrochromic mirror comprising:
- a transparent substrate;
- a transparent electrode film which is formed on the transparent substrate and has conductivity;
- an electrochromic film which is formed on the transparent electrode film and can be colored by reduction;
- a light reflecting film which is formed on the electrochromic film and which hydrogen atoms can permeate;
- a support substrate which has a conductive part having conductivity formed on at least one surface thereof;
- a sealant disposed between said transparent electrode film and said conducting part of said support substrate that contains said electrolytic solution,
- wherein the transparent substrate is located close to the support substrate such that the conductive part faces the light reflecting film, and side edges of said electrochromic film and said light reflecting film are spaced away from said sealant such that electrolytic solution contacts said side edge.

* * * * *